United States Patent

[11] 3,614,616

[72] Inventors: Jiri B. Bucek; James R. Shultz, both of York, Pa.
[21] Appl. No. 875,193
[22] Filed Nov. 10, 1969
[45] Patented Oct. 19, 1971
[73] Assignee Fincor, Inc. York, Pa.

[54] BIDIRECTIONAL AC TACHOMETER
10 Claims, 4 Drawing Figs.
[52] U.S. Cl............................................. 324/165, 340/271, 317/5
[51] Int. Cl............................................. G01p 3/52
[50] Field of Search............................ 324/69, 70, 86, 83 D, 83 Q; 340/271, 263; 318/314, 328; 317/5, 19; 73/229–231; 235/151.32, 92 D; 307/122, 123

[56] References Cited
FOREIGN PATENTS
1,284,743  1/1962  France ...................... 165/

Primary Examiner—Michael J. Lynch
Attorneys—John R. Bronaugh, Floyd S. Levison, Dennis O'Connor and Richard A. Speer ABSTRACT: An alternating current tachometer and circuit in which an AC tachometer generator has two 90° out-of-phase windings independently connected through rectifiers, with outputs connected in parallel to provide a DC output potential. Using a large number of poles in the AC generator results in DC with a low ripple component. A reversing relay in the bridge output circuit applies the DC to an output signal terminal at a positive or negative level (relative to a common lead) depending upon and hence indicative of the direction of rotation of the tachometer generator. An electric circuit controls the relay condition in response to correlation of the two out-of-phase alternating signals, the signals being independently detected at their zero crossover point. The control circuit detects, differentiates, accomplishes a comparison gating of the out-of-phase signals and provides one or the other of two control signals which, via a register, controls the relay condition to provide the DC potential representing one or the other direction of generator rotation. Regardless of polarity, the amplitude of the DC voltage output will be indicative of rate of rotation.

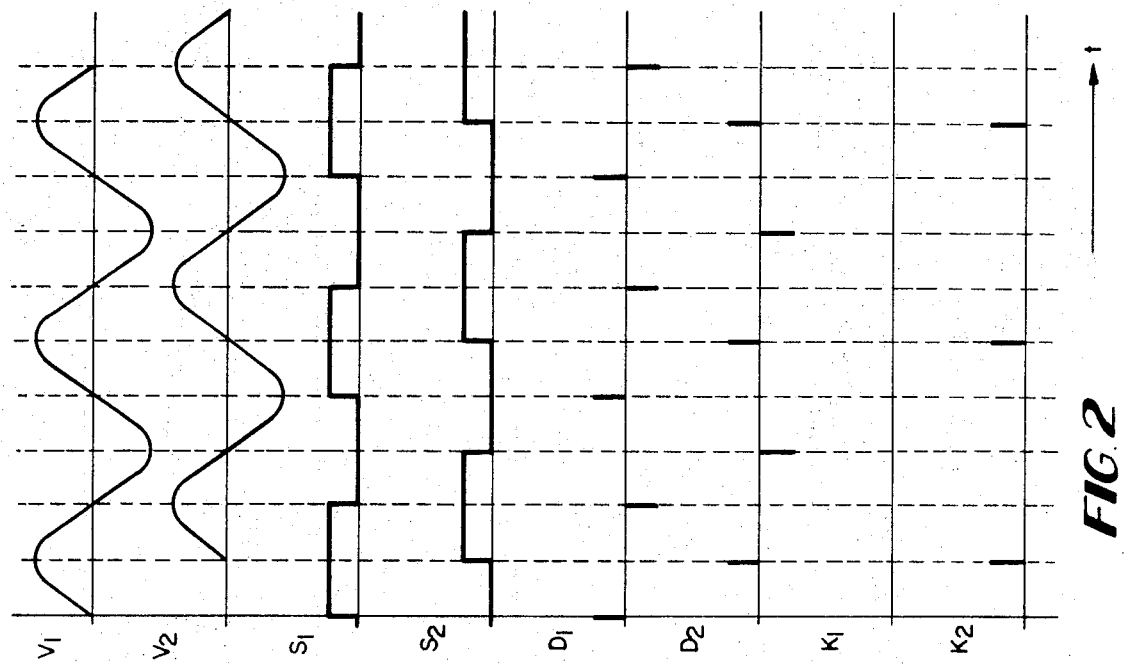
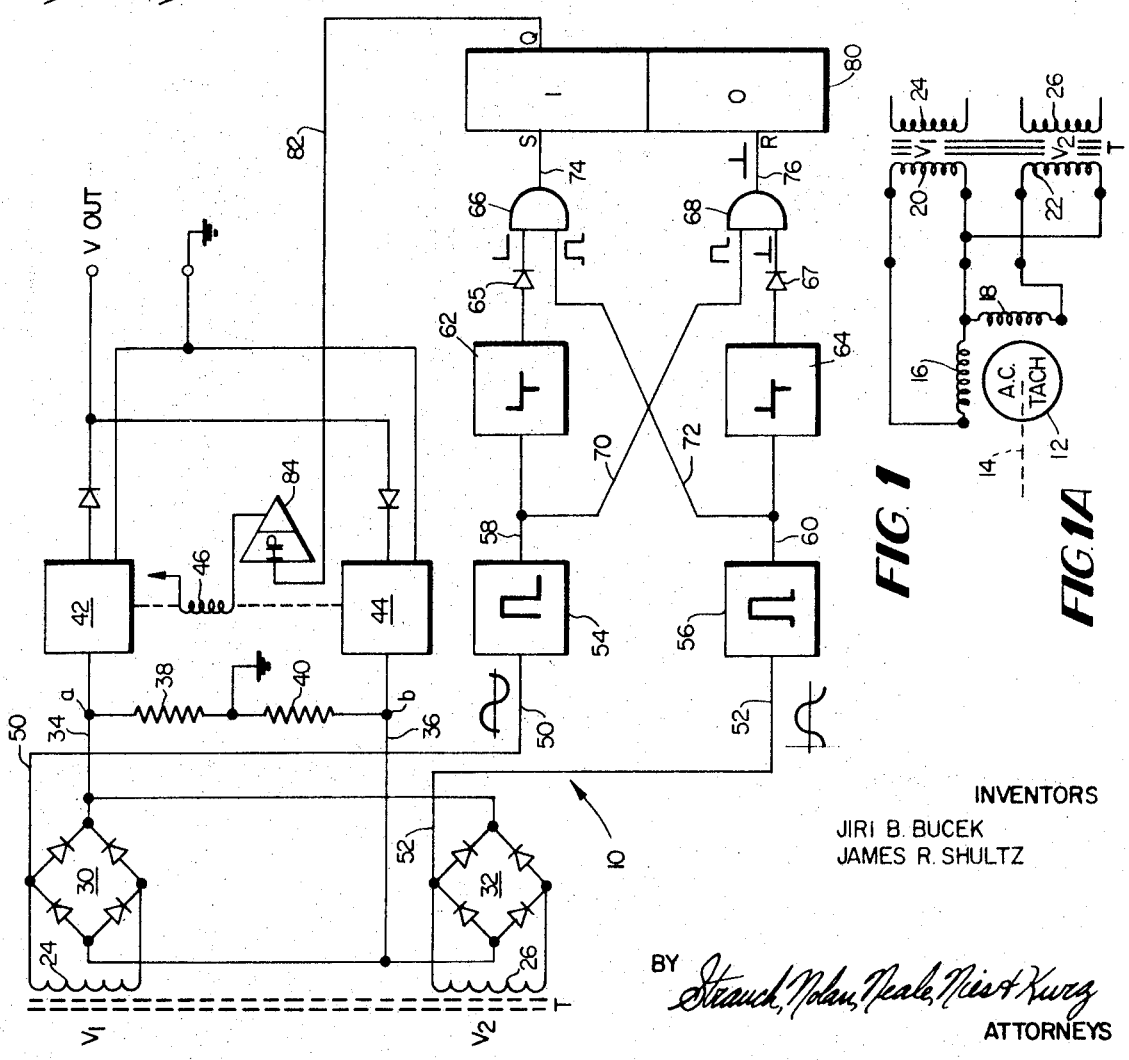
FIG. 2
FIG. 1
FIG. 1A
INVENTORS
JIRI B. BUCEK
JAMES R. SHULTZ
BY *Strauch, Nolan, Neale, Nies & Kurz*
ATTORNEYS

BIDIRECTIONAL AC TACHOMETER

SUMMARY OF THE INVENTION

This invention relates to electric tachometers and has particular application to tachometers which are used for measuring both direction and rate of rotation of shafts. Many applications of tachometers require an output indication (signal condition) for both the direction and rate of rotation of a shaft or other body and one example for which the present invention was developed to obtain a control signal indicative of direction and speed of elevator power motors. In such an application the representative signal is used together with signals representing other control conditions required in an automatic electronic elevator control circuit.

A primary object of this invention is to provide a simple AC tachometer including a novel circuit to measure and provide a reliable signal which is indicative of both rate and direction of rotation of a body.

A further object of this invention resides in the provision in an AC tachometer of a novel bidirectional signal output enabled through the medium of a relay controlled by a circuit responsive to an AC generator output. The circuit includes reversing switch contacts of the relay connected to the rectified signal output of the tachometer generator. Two out-of-phase, alternating wave signals from the tachometer generator are passed through independent full wave rectifiers to provide a single DC output with a low ripple value. The reversing relay enables reversal of the polarity of the DC output, one polarity being determined by energizing the relay, the other determined upon deenergization of the relay. Relay control is provided by a novel electronic circuit responsive to the sequence relationship of the out-of-phase signals from the AC tachometer generator. The detected phase signals are independently fed through the electronic circuit which differentiates and provide a rectified comparison of the two independent signals, placing an output signal on one or the other of two output terminals which represents the two different sequence relationships of the out-of-phase signals corresponding to the two directions of rotation of the generator. The rotation indicative output signal from the differentiating and rectifying circuit controls an electronic bistable register, which in turn controls a power circuit for the reversing relay.

Other objects of this invention will be apparent from the following description taken in conjunction with the accompanying drawings which are now briefly described.

BRIEF DESCRIPTION OF DRAWINGS

FIG. 1 is a logic diagram illustrating the electronic tachometer circuit of this invention;

FIG. 1A is a circuit diagram illustrating connections from the tachometer AC generator to the input side of the transformer shown in FIG. 1;

FIG. 2 is a chart showing signal wave forms developed at progressive locations from the two phases of the tachometer generator through the relay control circuit.

GENERAL DESCRIPTION

Figure 3:
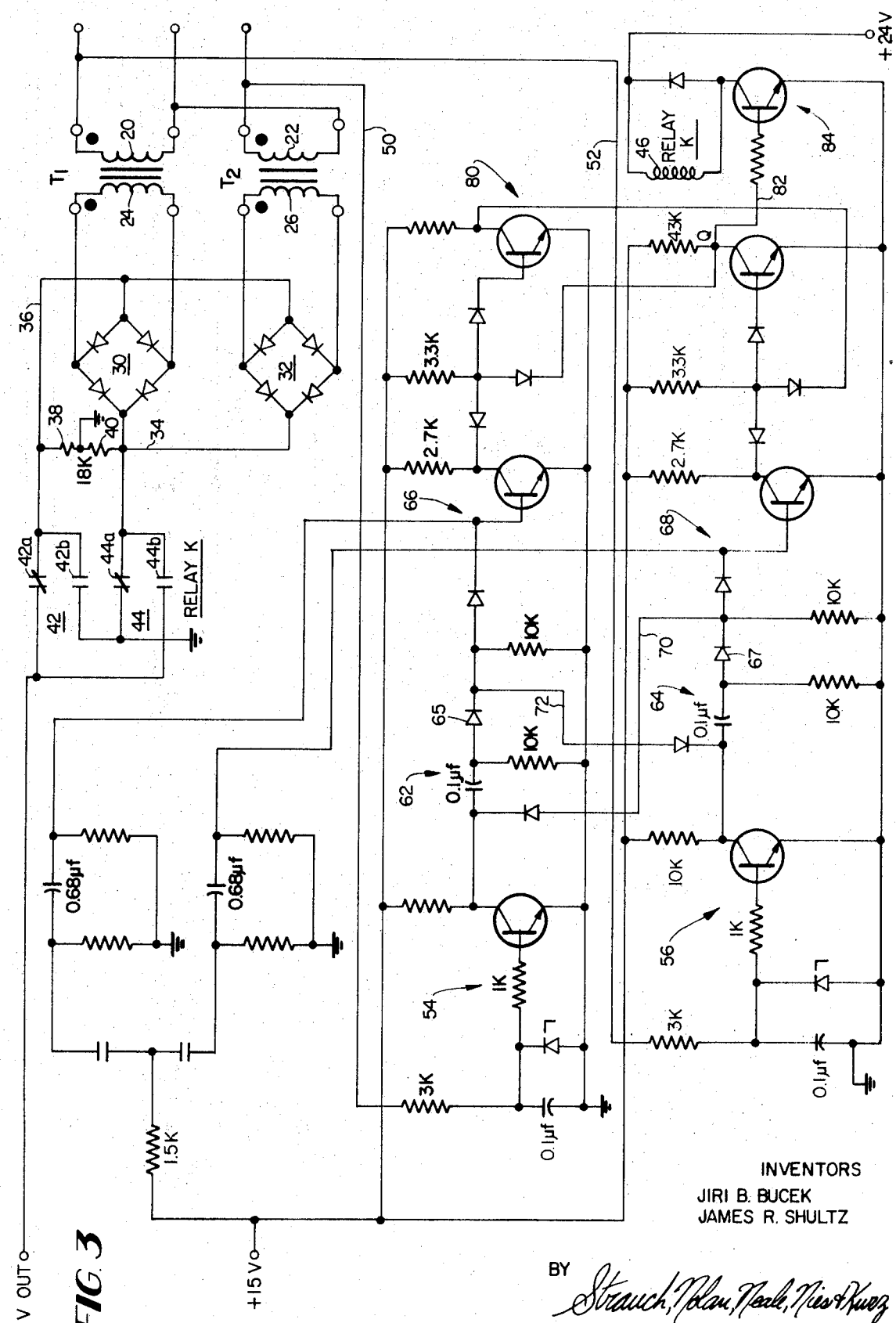
FIG. 3 is an exemplary circuit diagram illustrating an operative electronic circuit utilizing the present invention.

The logic of the electronic circuit 10 of the bidirectional AC tachometer is shown in FIG. 1 while FIG. 1A shows the tachometer generator part of the circuit with the generator 12 coupled for rotation with a rotatable shaft 14, the rate of speed and rotational direction of which are to be measured. Inasmuch as this invention was developed in connection with AC elevator power motors, shaft 14 could be the shaft of an elevator motor or the pulley shaft by which an elevator is raised and lowered. It is to be understood, this invention is not restricted to elevator tachometers. Such a tachometer may be used in any installation in which a signal output indicative of the rate and direction of shaft rotation is desired, for example another use might be as a directional tachometer connected to a ship's propeller drive shaft.

The tachometer generator used in the exemplary embodiment was made with an 18 pole permanent magnet rotor, although more or less poles could be used. Two stator windings 16 and 18 are arranged to provide alternating output signals $V_1$ and $V_2$ in a preferrable 90 degree (electrical) out-of-phase relationship throughout the entire speed range of the shaft to which the tachometer is connected. The out-of-phase relationship need not be 90° although that relationship enables the optimum conditions for signal comparison. The two tachometer windings are connected to respective primary windings 20 and 22 of transformer T (or $T_1$ and $T_2$ as shown in FIG. 3) which provides an inductive connection of the out-of-phase signals to the transformer secondaries 24 and 26. Secondary winding 24 is series connected to the input terminals of a full wave diode rectifier bridge 30 and secondary winding 26 is series connected to the input terminals of a second full wave diode rectifier bridge 32. The output terminals of the two bridge rectifiers 30 and 32 are connected in a parallel circuit so, in the 18 pole generator example being discussed, the two signals $V_1$ and $V_2$ after being full wave rectified result in a DC signal having a 9.4 percent ripple component, assuming that the AC signals from the tachometer generator are sinusoidal.

The two legs 34 and 36 of the paralleled bridge outputs are connected by respective resistors 38 and 40 to the common ground reference point "c" for the tachometer circuit.

Assuming that resistors 38 and 40 have equal resistance, the voltages at points "a" and "b" will be DC signals having a 9.4 percent ripple, being of equal magnitude and having opposite polarity.

A circuit from rectifier output "a" passes through one contact set 42a of a double pole switch 42 to a signal output terminal identified as $V_{out}$ or through its other contact set 42b to ground. The output from rectifier output "b" passes through one contact set 44a of a second double pole switch 44 to ground or through its other contact set 44b to the output signal terminal $V_{out}$. The two switches 42 and 44 are actually the contacts of a double pole-double throw relay K, depicted at the upper center part of FIG. 3 with the relay operating coil 46 shown at the lower right hand part of FIG. 3. Depending upon which of the switch contacts sets 42a and 44a or 42b and 44b are engaged the voltage output will be either positive or negative, of a magnitude dictated by the speed of the tachometer generator, and at a DC level with a 9.4 percent ripple component. Such a signal provides a very smooth and accurate control.

To determine the direction of shaft rotation, the phase relationships and zero crossover points of the two sinusoidal voltage signals $V_1$ and $V_2$ (See FIG. 2) derived from the tachometer generator are detected, shaped, differentiated and compared in order to provide an appropriate rectified output signal indicative of direction. The $V_1$ and $V_2$ voltage signals can be detected at either side of the inductive circuit between the tachometer and the full wave bridges. In FIG. 1, the detection circuit connections are made on the bridge side of the transformer T, whereas in FIG. 3 detection is accomplished on the tachometer side of the dual transformer, represented as $T_1$ and $T_2$.

In either case, one phase detection connection 50 detects the signal $V_1$ and the other phase detection connection 52 detects the signal $V_2$. The two phase detecting connections 50 and 52, respectively connect to the inputs of associated square wave generators, 54 and 56, which detect the zero crossovers of $V_1$ and $V_2$, respectively and provide square wave signal outputs, identified in FIG. 2 as $S_1$ and $S_2$ which, in the example under consideration, are shown in one of the 90° out-of-phase sequential relationships. Each of the two square wave generators 54 and 56 has its output 58 and 60 connected to the input of a differentiating circuit 62 and 64. The output of differentiating circuit 62 is connected through a blocking diode 65 to one of the inputs of an AND gate 66 and the output of differentiating circuit 64 is connected through a blocking diode 67 to one input of an associated AND gate 68.

The blocking diodes 65 and 67, as half wave rectifiers, block the negative going differentiated spikes emanating from their respective differentiating circuits 62 and 64.

A parallel connection 70 from the output 58 of square wave generator 54 is connected to the second input of AND gates 68 and a parallel connection 72 from output 60 of square wave generator 56 is connected to the second input of AND gate 66.

Thus the two inputs of AND gate 66 receive the square wave signal $S_2$ corresponding to the detected AC phase signal $V_2$ and the differentiated positive going spikes $D_1$ corresponding to the detected AC phase signal $V_1$; and the inputs of AND gate 68 receive the square wave signal $S_1$ corresponding to the detected AC phase signal $V_1$ and the differentiated positive going spikes $D_2$ corresponding to the detected AC phase signal $V_2$.

When AND gate is gated on, i.e., when a positive potential appears on both of its inputs, control signal spikes identified as $K_1$ in FIG. 2 appear on its output level 74; and when AND gate 68 is gated on, i.e., when a positive potential appears on both of its inputs, control signal spikes identified as $K_2$ in FIG. 2 appear on its output lead 76. The two ($K_1$ and $K_2$) control signal leads 74 and 76 are connected respectively to the set and reset inputs of a register (flip-flop) 80. The Q output signal from register 80 connects through line 82 to the input of a driver circuit 84 which controls energization of the operating coil 46 of the relay K.

The only time that one of the control output signals $K_1$ and $K_2$ can attain a nonzero value is when $S_1$ and $D_2$ are both positive or when $S_2$ and $D_1$ are both positive. The sense of rotation which has been used to depict the wave forms in FIG. 2 is 1. so that the phase of wave signal $V_1$ leads the phase of wave signal $V_2$ by 90 electrical degrees. For this condition, it will be seen that there is no output signal $K_1$ because the $D_1$ spike is always negative whenever the $S_2$ square wave appears. However, there will be a $K_2$ signal appearing on the output of AND gate 68 and this occurs every time a positive $D_2$ spike is generated from differentiating circuit 64 because at that time there is a positive value provided by the square wave $S_1$. Thus, for the sense of clockwise rotation which has been depicted in FIG. 2 there is no signal $K_1$ but there is a signal $K_2$ which is imparted to the reset input of register 80.

The register 80 is so arranged that a $K_1$ input on set lead 74 will result in a high (or "on") state of output signal Q and a $K_2$ input on reset lead 76 will result in a low (or "off") state of output Q. When output Q is "on" relay K will be energized closing contacts 42a and 44a applying a signal of a specific polarity on the $V_{out}$ terminal and when the register output Q is "off" relay K is deenergized to reverse its switch contacts and reverse the polarity of the signal on the $V_{out}$ terminal.

If the sense of rotation of the shaft 14, in which direction and speed is being measured, is reversed, a $K_1$ signal appears on the output of AND gate 66 and is applied to the set input lead 74 and the register output Q will be "on." The counter-clockwise direction can be visualized by reversing the indices on the various wave form references letters shown in FIG. 2, while still retaining the specific waveforms shown on the chart.

Thus the polarity of the voltage output at terminal $V_{out}$ is an indicator, or signal condition, which can be used by other well known circuits (not a part of this invention) to control power equipment or merely to indicate direction as, for example, by a bipolar voltmeter. At the same time the amplitude of the rectified DC voltage appearing at terminal $V_{out}$ is an indicator or signal condition which can be used in other known circuits (not a part of this invention) to control equipment or to provide a visual speed indicator.

The detail circuitry of FIG. 3 is exemplary of components with various operating levels and resistance and capacitor values used in an operative circuit in accord with the hereinbefore described logic.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patents is:

1. An electronic signal producing device comprising: first circuit means having means responsive to rotation of a rotating body for producing at least a two phase AC signal and a rectifying circuit for rectifying each of the individual phase output signals providing a related DC potential on output terminals, said DC potential being proportional to the speed of said rotating body; additional electronic circuit means connected to (both) said (AC signal producing means) means for producing said AC signals and said rectifying means having circuits for independently detecting said two AC phase signals, then shaping, differentiating and (cross comparing the shaped and differentiated signals) determining the relative phase relationship of said output signals to selectively alternatively provide one or the other of two control signals indicative respectively of opposite directions of out-of-phase relationship of said two AC phase signals, and means responsive to said two control signals for reversing the DC polarity on said output terminals, whereby said DC output has amplitude values indicative of speed and polarity values indicative of direction of rotation of said body.

2. A bidirectional, alternating current tachometer comprising: an AC generator having a rotor and a stator providing at least two out-of-phase alternating current signals whose relative phase is related to the direction of said rotor; rectifier means connected to said generator to (independently) rectify each of said two AC signals and providing a common direct current output signal proportional to the speed of said rotor circuit; said DC output circuit having switching means for reversing the polarity of the DC output; electronic means connected between said generator and said rectifier means for independently detecting each of the two out-of-phase AC signals, said electronic means including means for generating a related square wave signal for each out-of-phase AC signal, and independently differentiating each square wave signal, (cross comparison) individually gating each square wave signal with the differential signal of the other square wave signal to alternatively provide one to two independent trigger signals indicative respectively of opposite directions of out-of-phase relationships of said AC signal; and electronic means, responsive to one or the other of said trigger signals, connected to control said switching means to alternatively provide the DC output signal circuit with normal or reverse polarity.

3. An AC tachometer as defined in claim 2, wherein a terminal is provided common to said two phase windings and additional terminals are provided on the opposite sides of each phase winding; said rectifier means comprises a pair of rectifier bridges, each bridge being energized in accordance with the output between said common terminal and a separate one of said additional terminals and connections for connecting the outputs of said rectifiers in parallel with a balancing series resistor network bridging the parallel outputs of said bridges, and providing a common ground level at an intermediate point in said series resistor network.

4. An AC tachometer as defined in claim 2, wherein said electronic means for detecting, shaping, differentiating and gating comprises solid state circuits and means provide rectification of said differentiated signals during crosscomparison gating.

5. An AC tachometer as defined in claim 2, wherein the amplitude of said DC potential is indicative of speed, said electronic circuit has means which provide DC signal pulses on independent circuits indicative of both speed and direction of rotation, and said electronic circuit controls the polarity of said DC potential to provide a condition indicative of direction of generator rotation.

6. A system for measuring and providing signals indicative of speed and direction of rotation of a rotatable body comprising: a multiphase generator connected to rotate with said body having at least two phase windings with a terminal on the opposite side of each phase winding; a pair of rectifier units, each unit being connected to and energized in accordance with the level of AC signal output between said common terminal and a separate one of said additional terminals, connections for connecting the variable lever DC outputs of said rectifier units with a balancing resistor means, a switching device having means for reversing the polarity of the DC output and appearing at said output terminal means; and means for actuating said switching device responsive to the phase sequence relationship of the two AC inputs for actuating said switching device to one condition when one of the input phase of the AC signals leads the other in timed sequence and for reversing said switching device to its other condition when the other input phase of the AC signals leads said one input phase to thereby provide DC output signals at said output terminal means of one polarity responsive to one direction of rotation of said generator and of another polarity responsive to the opposite direction of rotation of said generator.

7. In a measuring system as defined in claim 6, said switching device is a double pole-double throw relay, and said means for actuating said switching devices comprising: a solid-state phase detecting control circuit having a circuit for detecting the zero crossover point for each of said AC voltage phases, circuitry for individually shaping, differentiating and rectifying the two signals and gating and control circuitry to compare shaped signals with differentiated signals to obtain a selected one of two isolated output signals dependent upon the direction of generator rotation; and bistable electronic circuitry responsive to a signal on one or the other of said two isolated outputs to control said relay respectively to each of its normal and reversing conditions.

8. In a measuring system as defined in claim 7, each of said rectifier units being full wave diode bridge rectifiers.

9. An AC tachometer comprising: a rectifier circuit; an AC generator having at least two phase windings connected through said rectifier circuit to provide a DC output whose potential has an amplitude indicative of speed; and an electronic circuit including means for measuring the relative phase of the AC signals from each of said phase windings and providing DC output signals on independent circuits representative of both speed and direction of rotation of said generator.

10. An AC tachometer as defined in claim 11, wherein said electronic circuit includes means connected to the output of said rectifier circuit to control its output polarity in response to said DC output signals indicative of direction of rotation of said generator.

PO-1050
(5/69)

UNITED STATES PATENT OFFICE
CERTIFICATE OF CORRECTION

Patent No. 3,614,616      Dated October 19, 1971

Inventor(s) JIRI B. BUCEK and JAMES R. SHULTZ

It is certified that error appears in the above-identified patent and that said Letters Patent are hereby corrected as shown below:

Column 3, line 31, delete "1." and insert in lieu thereof "clockwise".

Column 4, line 46, after "one" delete "to" and insert in lieu thereof "of".

Column 6, line 21, change "11" to "9".

Signed and sealed this 11th day of July 1972.

(SEAL)
Attest:

EDWARD M. FLETCHER, JR.       ROBERT GOTTSCHALK
Attesting Officer      Commissioner of Patents